US012137721B2

(12) United States Patent
May et al.

(10) Patent No.: US 12,137,721 B2
(45) Date of Patent: Nov. 12, 2024

(54) PROCESSING POMACE FROM GRAPE CRUSH TO HARVEST GRAPE SEEDS

(71) Applicant: Welch Foods Inc., Concord, MA (US)

(72) Inventors: Gregory A. May, Westford, MA (US); Samuel B. Greenberg, Chicago, IL (US)

(73) Assignee: Welch Foods Inc., Concord, MA (US)

( * ) Notice: Subject to any disclaimer, the term of this patent is extended or adjusted under 35 U.S.C. 154(b) by 0 days.

(21) Appl. No.: 17/812,551

(22) Filed: Jul. 14, 2022

(65) Prior Publication Data
US 2023/0025086 A1 Jan. 26, 2023

Related U.S. Application Data

(60) Provisional application No. 63/224,676, filed on Jul. 22, 2021.

(51) Int. Cl.
A23N 4/24 (2006.01)
A23L 5/20 (2016.01)

(52) U.S. Cl.
CPC . *A23N 4/24* (2013.01); *A23L 5/20* (2016.08)

(58) Field of Classification Search
CPC . A23N 4/24; A23N 15/00; A23N 4/00; A23N 4/12; A23L 5/20
See application file for complete search history.

(56) References Cited

U.S. PATENT DOCUMENTS

| 6,004,404 | A | * | 12/1999 | Ackerman | B07B 9/00 15/305 |
| 6,312,753 | B1 | * | 11/2001 | Kealey | A23L 3/349 426/631 |
| 2007/0104842 | A1 | * | 5/2007 | Margolis | A23N 4/10 426/484 |

FOREIGN PATENT DOCUMENTS

IT 102018000021319 A1 6/2020

OTHER PUBLICATIONS

Flyer Air Recycling Aspirator, Bühler AG, 4 pages, Jan. 2018.
Cyclo Aspirator, Bench Industries, 3 pages, downloaded on Aug. 23, 2022.
Duo Aspirator Brochure, Carter Day International, 2 pages, Sep. 26, 2011.
Debearder and Thresher Brochure, Carter Day International, 1 page, downloaded on Aug. 23, 2010.
VDMC Models & Specifications, Carter Day International, 2 pages, 2011.
Maness, N., et al., "A Small Scale System for Grape Seed Value-Added Products from Oklahoma Winery Waste", 10 pages—downloaded on Aug. 23, 2022.
Milea, D., et al., "Performant Equipments Designed for Grape Marc Seeds Separation and Calibration for Superior Capitalization in Food and Phytopharmaceutical Industry", Annals of Faculty Engineering Hunedoara—International Journal of Engineering, 8 pages, Feb. 27, 2019.

(Continued)

*Primary Examiner* — Brian W Jennison
(74) *Attorney, Agent, or Firm* — Hamilton, Brook, Smith & Reynolds, P.C.

(57) ABSTRACT

Systems and methods are provided for separating seed from wet material. The method includes aerating raw, wet material comprising seed to provide an aerated material and aspirating the aerated material. The aspirating separates seed from liftings of the aerated material, and the separated seed can then be recovered.

11 Claims, 6 Drawing Sheets

(56) References Cited

OTHER PUBLICATIONS

Romaniello, R., et al., "Development of a centrifugal separator for grape mare: effect of the blade position and rotor speed on grape seed separation performance", Heliyon, 17 pages, Mar. 1, 2019.
Tamborrino, A., et al., "Use of a Centrifugal Separator to Separate Grape Seeds from Marc: Mechanical Settings and Thermographic Evaluations", Chemical Engineering Transactions, vol. 75, 2019, 6 pages.
Carter Day International Sizing and Separating Equipment, Debearder and Thresher, 2 pages, Mar. 11, 2019.
Debearder Pro Brochure, AT Ferrell, 4 pages, 2021.
Notification of Transmittal of the International Search Report and the Written Opinion of the International Searching Authority, or the Declaration for International Application No. PCT/US2022/073714, "Processing pomace from grape crush to harvest grape seeds" dated Nov. 2, 2022.

\* cited by examiner

PROCESSING POMACE FROM GRAPE CRUSH TO HARVEST GRAPE SEEDS

RELATED APPLICATION

This application claims the benefit of U.S. Provisional Application No. 63/224,676, filed on Jul. 22, 2021. The entire teachings of the above application are incorporated herein by reference.

BACKGROUND

The production of grape juice results in waste product that includes the remnants of crushed grapes, such as grape skins and grape seeds. For grape crushing processes that involve pressing, filter paper or other material, such as rice hulls, is typically also present in the waste product to assist with screw pressing of the grapes to extract grape juice. The resulting waste product from the crushing process is referred to as wet pomace.

SUMMARY

Methods and systems are provided that separate grape seed from wet pomace. Such methods and systems can be performed shortly after a pressing process is performed, which typically occurs shortly after harvesting of the grapes in the field.

A method of separating seed from wet material includes aerating raw, wet material comprising seed to provide an aerated material. The method further includes aspirating the aerated material. The aspirating separates seed from liftings of the aerated material. The separated seed is then recovered.

The aeration can include exposing the raw, wet material to a device comprising a plurality of rotating beater arms disposed among a plurality of stationary arms. Rotational movement of the rotating beater arms can provide for aeration of the raw, material. For example, the raw, wet material can be grape pomace. Wet pomace, such as grape pomace, typically includes large aggregates, or clumps, of grape skins, grape seeds, and paper that are compressed together and that retain a high moisture content. The aeration of the wet pomace can break up the large aggregates. An example of a device with which aeration can be performed is a debearder.

The aspiration can include exposing the aerated material to a device comprising an aspiration chamber. The aspiration can provide for separation of the aerated material into its component elements by density upon exposure to an air flow in the aspiration chamber. An example of a device with which aspiration can be performed is an aspirator, such as a grain aspirator.

A system for separating seed from wet material includes a first device that comprises a plurality of rotating beater arms disposed among a plurality of stationary arms and a second device comprising an aspiration chamber. The first device is configured to aerate raw, wet material comprising seed to produce an aerated material. The second device is configured to separate the aerated material into component elements by density upon exposure to an air flow in the aspiration chamber and output seed separated from the aerated material.

The first device can be a debearder. The second device can be aspirator. Optionally, the system can include a connecting element disposed between the first device and the second device to route material exiting an outlet of the first device to an inlet of the second device. The connecting element can be, for example, a conveyer belt or a chute. The first device and the second device can be disposed in serial connection such that material is processed sequentially by the first device and the second device.

A method of separating grape seed from wet pomace includes aerating the wet pomace with a first device to produce an aerated pomace and aspirating the aerated pomace with a second device to separate component elements of the aerated pomace by density. One of the component elements is grape seed. The method further includes collecting separated grape seed from the aspirator.

The first device can be a debearder. The second device can be an aspirator, such as a grain aspirator. The method can further include supplying the wet pomace to the first and second devices within about 24 hours, or within about 12 hours, after generation of the wet pomace from grape crush. The wet pomace can have a moisture content of about 40% to about 70%. The wet pomace can include materials remaining upon crushing of grapes to produce grape juice, including, for example, grape seed, grape skin, and filter residue.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Figure 1:
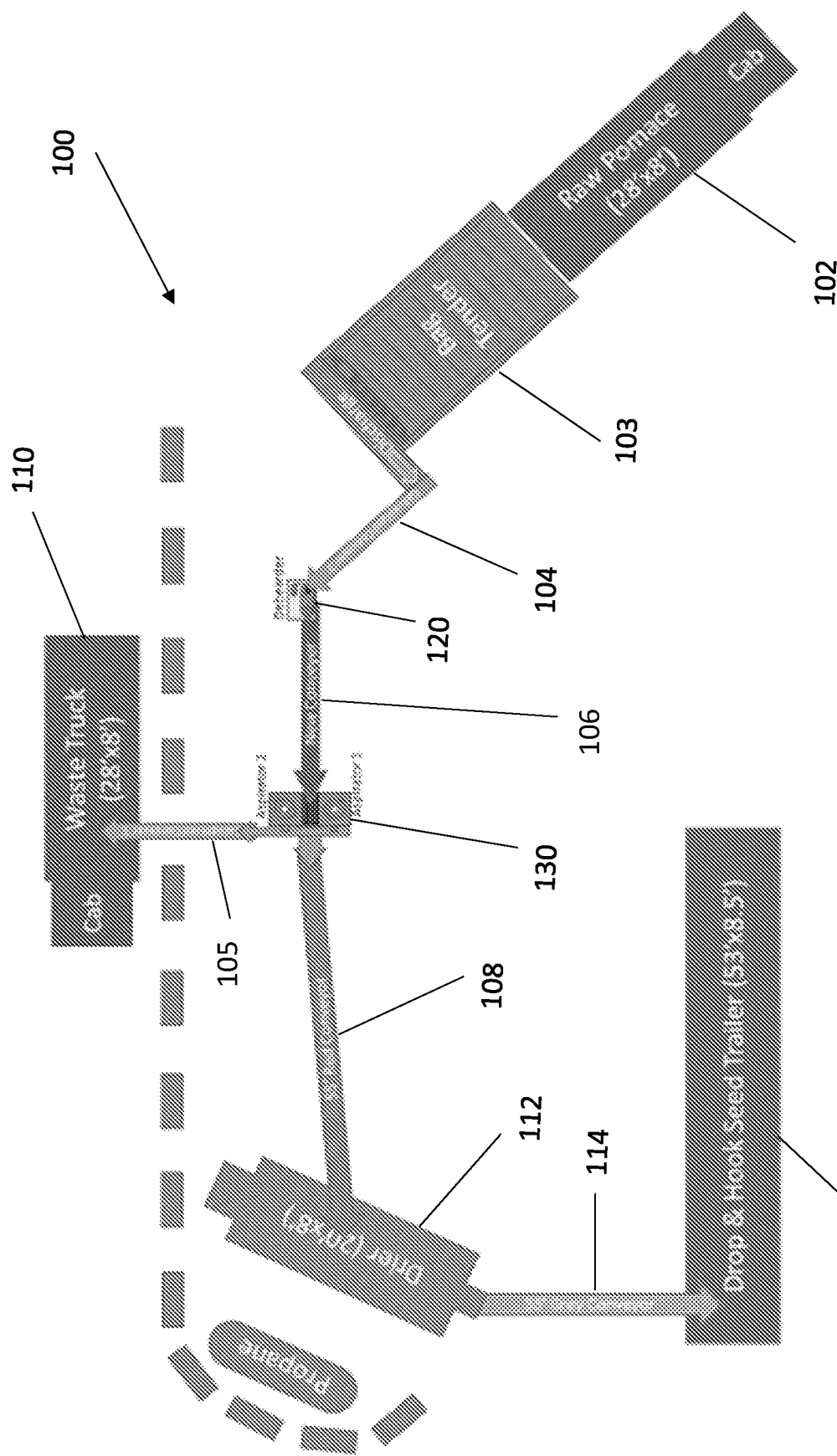
FIG. 1 is a schematic of an example process for processing pomace to harvest grape seeds.

A method and system of separating seed from wet material is shown in FIG. 1. For example purposes, the method is described with respect to the processing of grapes for the making of grape juice; however, the process may be applied to other fruits or vegetables that can be pressed for juice and from which seeds can be harvested for other purposes. Upon pressing of harvested grapes, the raw, wet pomace is collected. As illustrated in FIG. 1, the wet pomace is in a receptacle 102 that can be maneuvered by a cab and brought to a tender 103 from which it can then be discharged. A first connecting element 104, shown to be a conveyer belt, transports the raw, wet pomace from the bag tender 103 to a first device 120 for aerating the raw, wet material. As illustrated in FIG. 1, the first device 120 is a debearder. A second connecting element 106, also shown to be a conveyer belt, transports the aerated pomace to a second device 130. As illustrated, the second device 130 comprises two aspirators; however, a single aspirator or more than one aspirator can be included in the system. The aerated material is separated into seed and liftings at the second device 130. Waste product exiting the second device (e.g., liftings comprising grape skins and filter paper) can be fed directly into a waste receptacle 110, or can be transported to the receptacle 110 by a third connecting element 105. The seeds recovered from the second device 130 are collected and can, optionally, be transported to a drier 112 by a fourth connecting element 108. The dried seeds can then be collected in a receptacle 116, shown as a trailer in the figure, from which they can be transported for further processing. As illustrated, a fifth connecting element 114 is used to convey the dried seed from the drier 112 to the trailer 116. The connecting elements 104, 105, 106, 108. and 114 are illustrated to be conveyer belts; however other structures can be used, such as chutes.

The method and system shown in FIG. 1 enables the raw, wet pomace to be processed shortly after grape pressing and, optionally, in the field. It can be advantageous to separate grape seed from grape pomace shortly after pressing (e.g., within about 24 hours, within about 12 hours, or within about 6 hours after harvesting) to reduce a risk of spoilage and without energy- and time-intensive drying stages.

The provided methods and systems can be particularly effective and efficient for separating seed from the pomace of pressed juice grapes as opposed to the pomace of pressed wine grapes. Grapes produced for juice typically have thicker skins as compared to wine grapes. Furthermore, juice grapes are typically pressed with a pressing aid, whereas wine grapes are typically processed without pressing aids. During the pressing process for juice grapes, filter paper or other material, such as rice hulls, is used to assist the screw press. The pomace recovered from the pressing of juice grapes includes aggregates, or clumps, of compressed grape skins, grape seeds, juice-saturated filter paper or rice hulls, as well as some grape stems and other materials from the field (e.g., sticks, rocks). The compressed skin and paper fragments included in the pomace of juice grapes can be of a similar size and weight as that of grape seeds, rendering the pomace unfit for size-separation methods, such as rotating screen drum separation processes. In contrast, pomace produced from the pressing of wine grapes, where pressing aids are not used and where wine grapes have larger and lighter skins than juice grapes, can be efficiently processed with size-separation methods.

Recovering seeds from raw, wet pomace, is challenging due to moisture content and typically requires that the material be dried before separation, which is time and energy intensive. Furthermore, it is preferable to separate seed from raw, wet pomace as soon as possible upon juicing to prevent fungal growth in the material.

Figure 2:
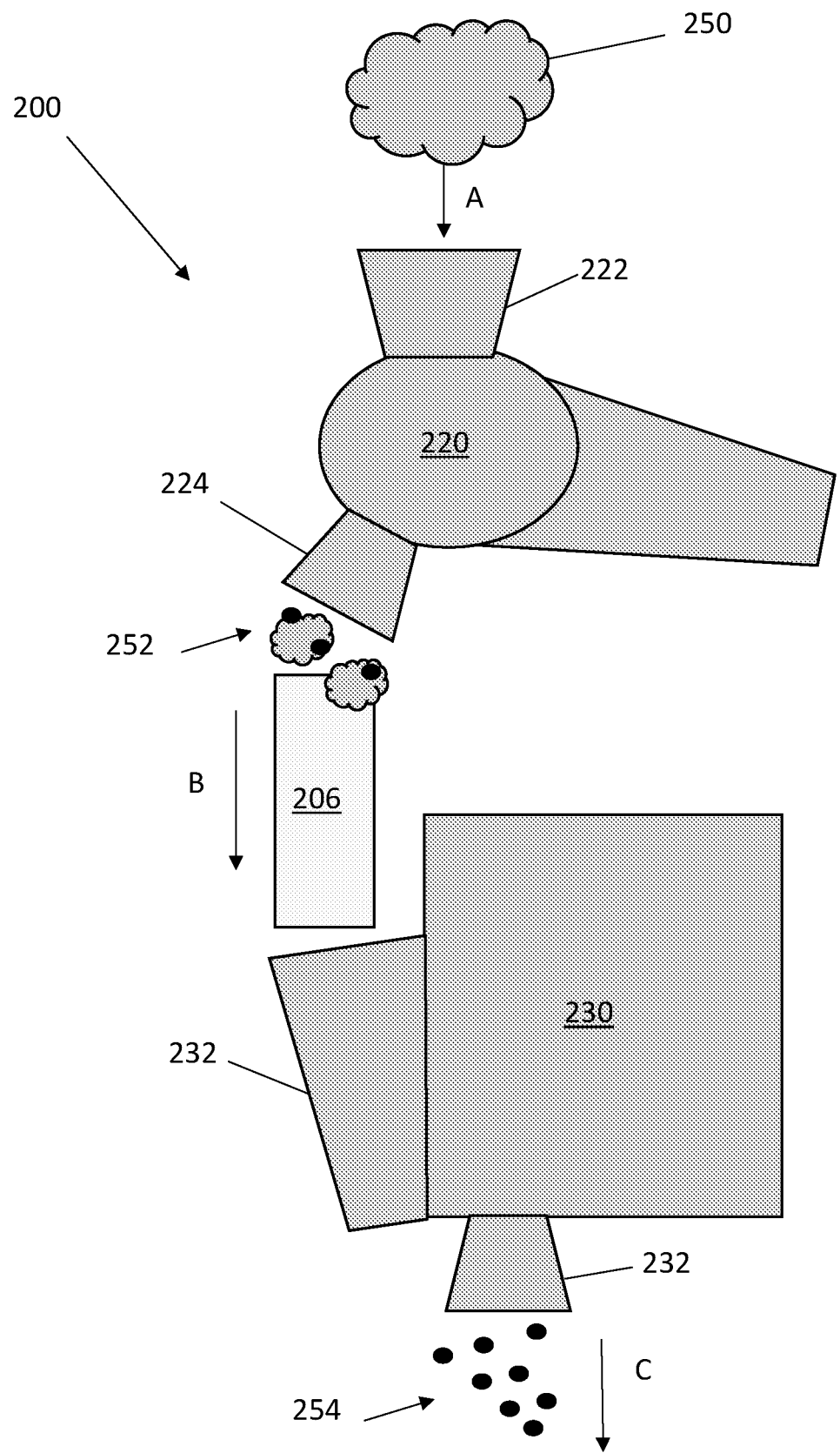
FIG. 2 is a schematic of an example system for processing pomace to harvest grape seeds.

A system 200 for separating seed from wet material is shown in FIG. 2. The system 200 includes a first device 220 configured to aerate the raw, wet material 250 to produce an aerated material 252. The system 200 further includes a second device 230 configured to separate the aerated material 252 into component elements by density, such as through exposure to an air flow, and output seed 254 separated from the aerated material.

The first device 220 can be a debearder (see FIG. 3) or other device that includes a plurality of rotating beater arms disposed among a plurality of stationary arms to aerate, or "fluff," the wet pomace 250. The first device 220 can include an inlet 222 configured to receive the wet pomace 250 (as indicated by arrow A) and an outlet 224 configured to expel the aerated material 252 (as indicated by arrow B).

The second device 230 can be an aspirator (see FIGS. 4 and 5), such as a grain aspirator, or other device that includes an aspiration chamber that can separate materials by density and/or by aerodynamic properties (e.g., shape, surface texture). The second device 230 can include an inlet 232 configured to receive the aerated material 252 (as indicated by arrow B) and an outlet 232 configured to expel separated seed 254 (as indicated by arrow C).

Disposed between the first and second devices 220, 230 can be a connecting element 206 configured to directly route the aerated material 252 for processing by the second device. The connecting element can be, for example, a belt conveyer, a cleated conveyer, a bucket conveyer, or a chute. The first device 220 can be disposed above the second device 230 such that the aerated material can be directly routed to the second device 230 by or with the assistance of gravity. For example, the first device can be mounted at a height above that of the second device 230 with a chute disposed between the outlet 224 and the inlet 232. The first and second devices 220, 230 can be in serial connection with one another such that, as the aerated material 252 exists the first device 220, it is automatically fed to the second device 230. The material can be processed continuously through the first and second devices 220 and 230. For example, raw pomace 250 can be supplied continuously to the first device 222 at a rate that enables the product to flow through the first device and into the second device for aspiration without clogging or overflowing either device. The aeration and aspiration processes provided by, respectively, the first and second devices can thereby provide for continuous processing of wet pomace. The continuous processing and ability to intake raw, wet pomace can thereby provide for quick and effective separation of seed from raw pomace immediately upon juicing, or relatively soon thereafter.

The first device 220 can include a plurality of rotating beater arms disposed among a plurality of stationary arms to aerate the wet pomace by rotational movement of the rotating beater arms. The aeration process can break up the aggregates of compressed grape skins, seeds, paper, and other materials that make up the wet pomace.

Figure 3:
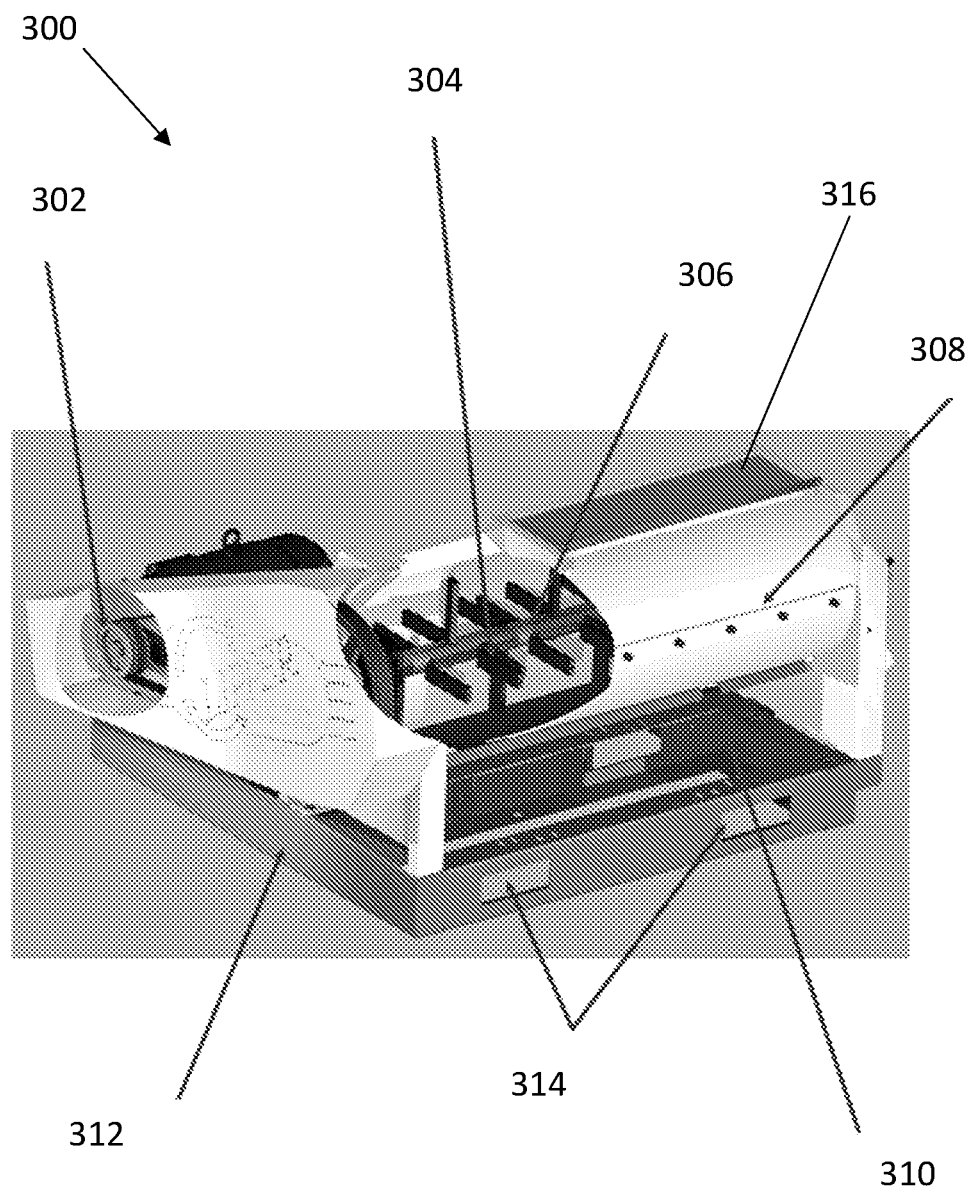
FIG. 3 is a schematic of an example debearder that can be used in the system of FIG. 2.

The first device 220 can be a debearder. Debearders are generally known in the art and are used for the processing of grain, which is a dry material. An example of a debearder 300 is shown in FIG. 3. The debearder includes several arms 304, at least a subset of which rotate about a shaft 306. Some arms 304 may be stationary. The arms 304 are disposed within a housing 308 and are connected to a motor drive 302, which drives rotation of at least a subset of the arms. The debearder 300 includes a base 312, which may include connection components 314, such as to receive a forklift. The debearder 300 further includes an inlet 316, typically disposed near a top of the housing, and an outlet 310 at which the processed material is discharged.

Examples of suitable debearders include the Clipper® Debearder Pro (A. T. Ferrel Company, Bluffton, IN) and the Carter Debearder (Carter Day, Minneapolis, MN).

Properties of the debearder, such as an angle or orientation of the rotating beater arms, a type and number of beater arms included in the housing, a rotational speed provided by the motor, and a discharge rate can be adjusted.

The second device 230 can include an aspiration chamber such that the aerated material is exposed to an air flow with which it may be broken down into component elements based on density and/or aerodynamic properties of the component elements. An aspirator, such as a grain aspirator, is suitable.

Figure 4:
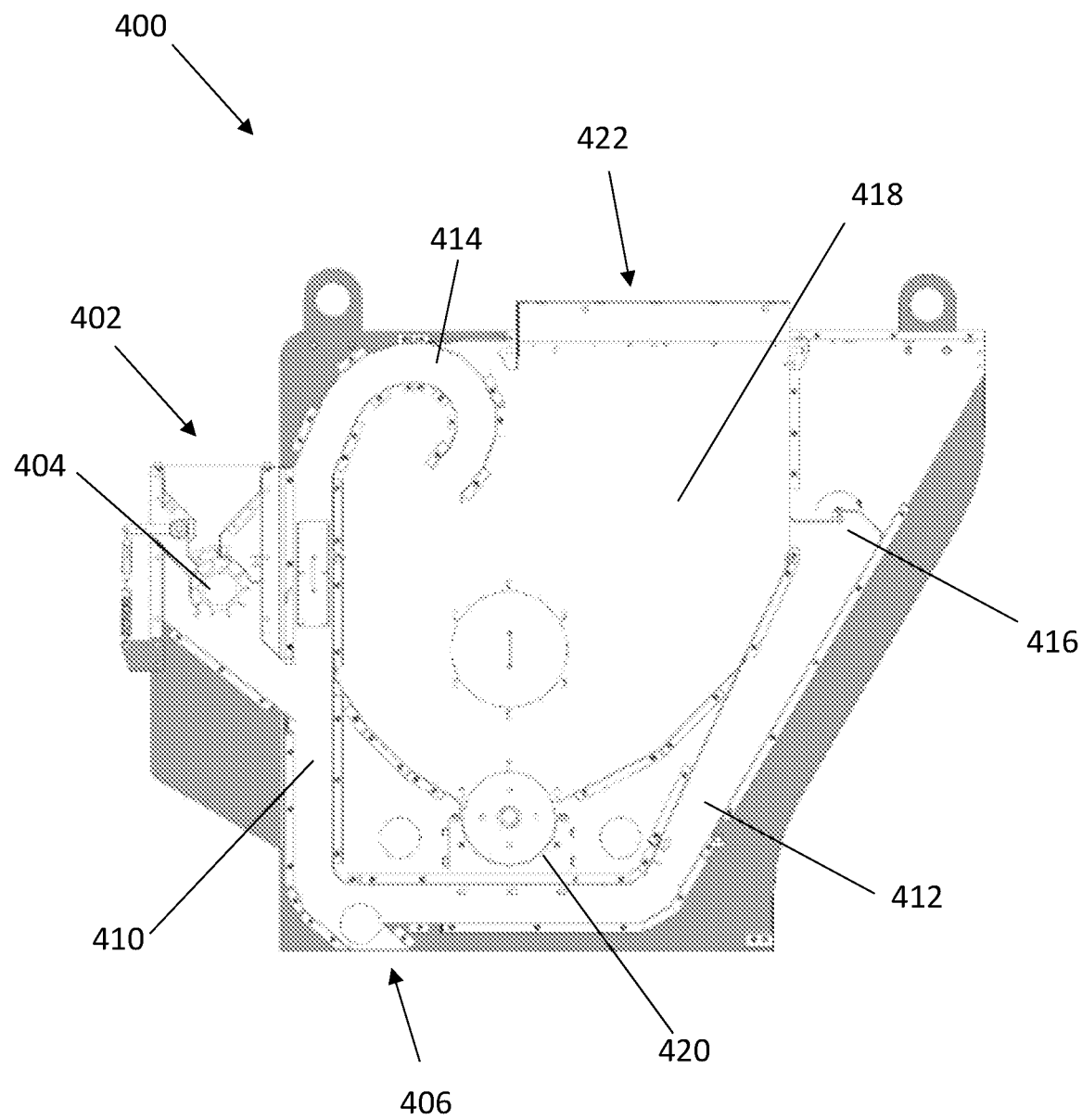
FIG. 4 is a schematic of an example aspirator that can be used in the system of FIG. 2.

Aspirators are known in the art. An example of an aspirators 400 is shown in FIG. 4. The aspirator 400 includes an inlet 402 configured to supply material to the aspiration chamber 410. Optionally, a feed roll 404 is included in a path from the inlet 402 to the aspiration chamber 410 to meter amounts of material entering the chamber 410. An airflow is introduced into the aspiration chamber 410 through flow path 412. The velocity of air entering the aspiration chamber can be controlled, at least in part, by a damper 416. Dense material is permitted to exit the aspirator 400 at outlet 406. Liftings are carried upwards through flow path 414 to a settling chamber 418. A liftings augur 420 can then separate heavier liftings from lighter liftings and enable the liftings to be expelled from one or more liftings outlets 422.

Figure 5:
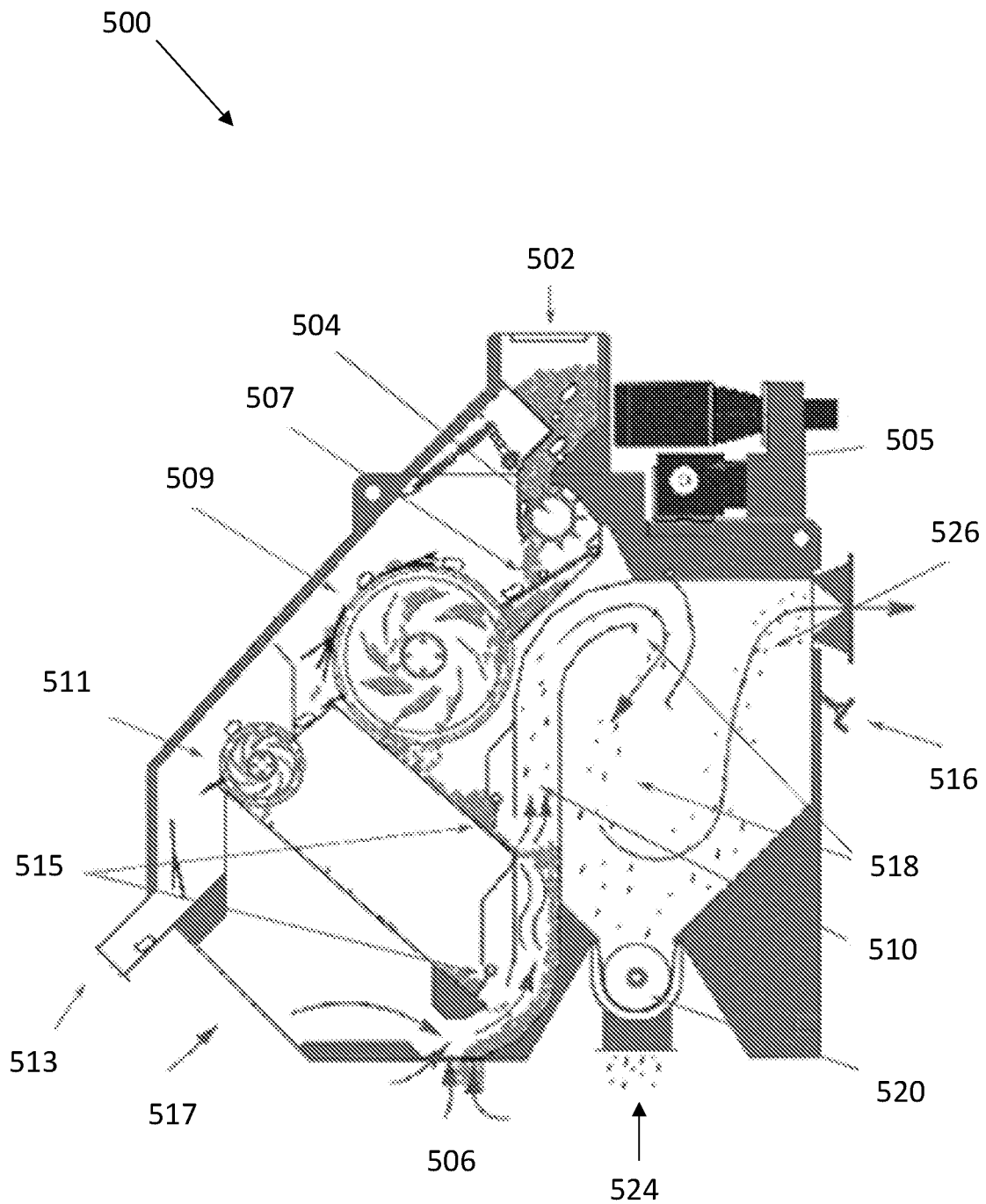
FIG. 5 is a schematic of another example aspirator that can be used in the system of FIG. 2.

Another example of an aspirator is shown in FIG. 5. The aspirator 500 includes an inlet 502 and a feed roll 504 that is operated by a feed roll drive 505 to meter the amount of material entering the device. A grid 507 can optionally be included to separate large items (e.g., rocks, twigs), which are then carried over first and second scalping reels 509, 511 and expelled by a scalpings discharge 513. While the aspirator 500 is illustrated as having two scalping reels, a first scalping reel 509 and a rescalping reel 511, an aspirator can include any number of scalping reels, including no scalping reel, a single scalping reel, or more than two scalping reels. Upon exiting scalping reels 509 and 511, the material to be processed is permitted to enter the aspiration chamber 510. Air lock valves 515 can be included to prevent air within the aspiration chamber from backflowing into the area in which scalping reels 509, 511 are housed. Air is supplied to the aspiration chamber 510 through an air inlet 517, and potentially through a product outlet 506. As illustrated, denser and/or less aerodynamic materials included within the product to be processed are permitted to fall to a base of the aspiration chamber 510 and are expelled through the outlet 506. Liftings are carried upwards towards a liftings chamber 518. A liftings conveyer 520 can assist with separation of relatively heavy liftings from light liftings, with heavier liftings exiting the liftings chamber 518 at a first liftings outlet 524 and lighter liftings exiting the liftings chamber 518 at a second liftings outlet 526. A velocity of air moving through the aspirator 500 can be controlled, at least in part, by a controller 516, such as a damper.

Examples of suitable aspirators include the Duo Aspirator (Carter Day, Minneapolis, MN), the Vertical Drop Multi-clean Aspirator (VDMC) (Carter Day, Minneapolis, MN), the Cyclo Aspirator (Bench Industries, Great Falls, MT), and the Air-recycling Aspirator (Baler, Switzerland).

Properties of the aspirator, such as feed rate, air volume within the aspiration chamber, air velocity, air acceleration, augur or liftings conveyer rate, and discharge rate can be adjusted.

While the process shown in FIG. 2 illustrates a single passing of the wet pomace through each of the first and second devices, the process can include recirculation of material through each or both of the devices. For example, raw, wet pomace may be circulated through a debearder two, three, four, or more times before being supplied to the aspirator. Alternatively, or in addition, the aerated pomace can be circulated through the aspirator two, three, four, or more times. The recirculation of aerated pomace through the aspirator can include cycles in which the primary product recovery (such as from outlets 232 (FIG. 2), 406 (FIG. 4), and 506 (FIG. 5)) is resupplied to the inlets of the aspirator. Alternatively, or in addition, the recirculation of aerated pomace through the aspirator can include cycles in which the secondary product recovery (such as from outlets 422 (FIG. 4), 524, and 526 (FIG. 5)) is resupplied to the inlets of the aspirator.

Figure 6:
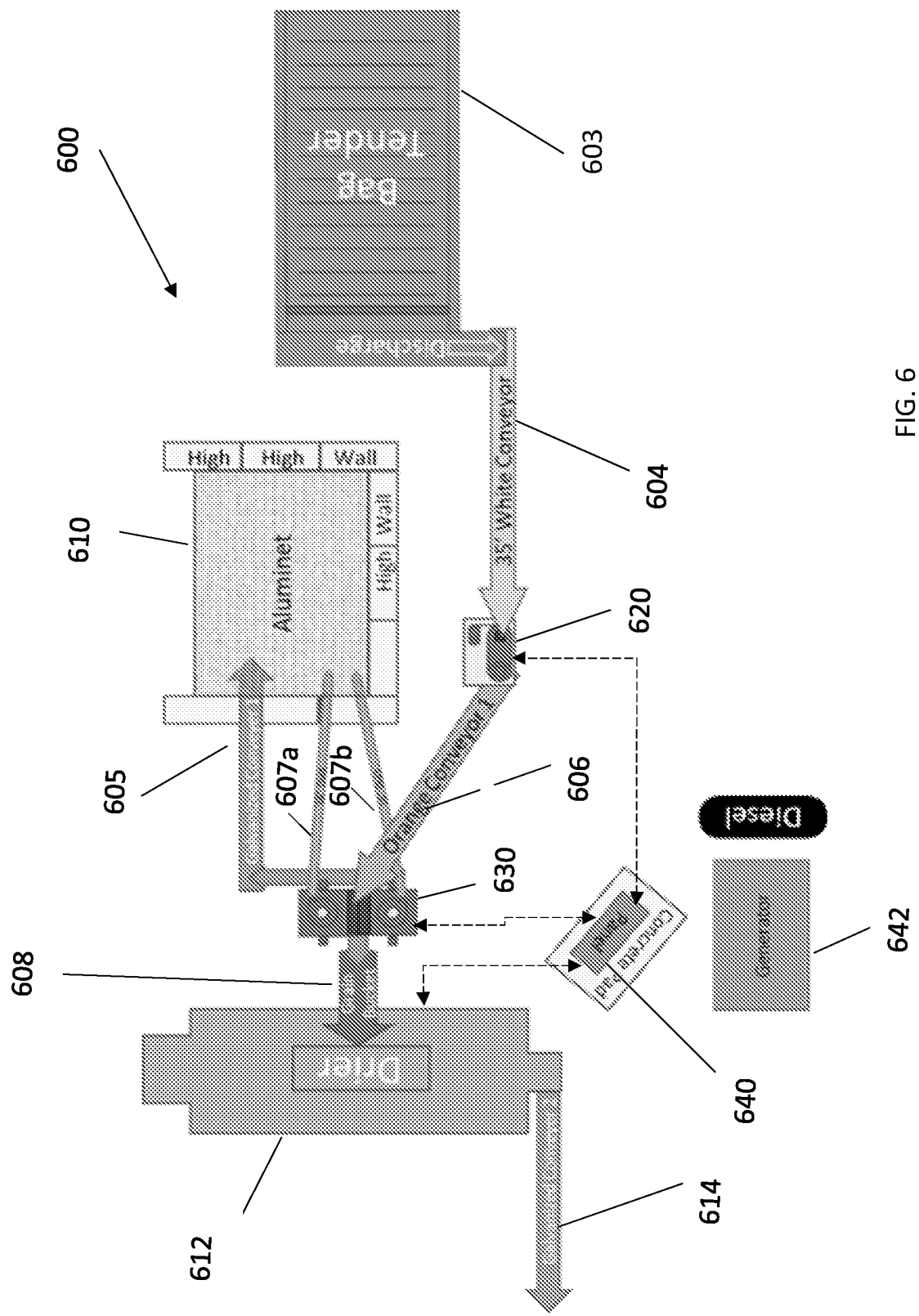
FIG. 6 is a schematic of another example system for processing pomace to harvest grape seeds.

Variations on the system shown in FIG. 1 are possible. An example system 600 is shown in FIG. 6, which illustrates optional variations in equipment configurations from the system 100 shown in FIG. 1. Any of the features shown in the systems of FIGS. 1 and 6 can be combined to provide for a suitable seed separation system. For example, as illustrated in FIG. 6, the system includes a tender 603 providing for initial storage of the wet pomace and first and second connecting elements 604, 606 for transporting the wet pomace to, respectively, a first device 620 for aeration and a second device 630 for aspiration. A third connecting element 605 can provide for transport of waste material to a waste receptacle 610. The third connecting element 605 can be, for example, a conveyor belt. Additional connecting elements 607a, 607b can be provided to transport fine waste from the second device 630 to a same or different waste receptacle. For example, the additional connecting elements 607a, 607b can be ducts/chutes, which can be better adapted for capturing and transporting finer waste materials than a conveyor belt.

The system 600 figure includes a fourth connecting element 608 to transport recovered seed to a dryer 612. The fourth connecting element can be, for example, a bucket elevator instead of a conveyor belt. A control panel 640 and power source 642 are further illustrated in FIG. 6. The control panel 640 can include a controller operatively coupled to any or all of the first device 620, second device 630, dryer 612, and connecting elements 604, 605, 606, 607a,b, 608, 614 to provide for controlled operation of at least part of the system. Communication from the control panel 640 to the first device 620, second device 630, and dryer 612 are illustrated by dashed line in FIG. 6. Additional communication links from the control panel 640 to other elements of the system, including connecting elements 604, 605, 606, 607a,b, 608, 614, are possible. As illustrated, the power source 642 is a diesel generator. The generator can be used to provide power to any of the devices 620, 630, 612. Other power sources are possible. For example, the power source can include one or more batteries.

Motors included in any of the first device 620, second device 630, dryer 612, and connecting elements 604, 605. 606, 608, 614 can be of an adequate horsepower to enable processing of wet pomace, which can be of a significant weight due to high moisture content.

Wet pomace can be processed for seed separation using the systems 100, 200, 600 immediately or shortly after pressing. For example, wet pomace can be supplied to the debearder and aspirator within about 24 hours, within about 12 hours, or within about 6 hours after generation of the wet pomace from grape crush. The wet pomace can include a moisture content of about 40% to about 70% moisture by weight, or about 45% to about 60% moisture by weight.

For wet pomace generated as a result of juicing, the wet pomace typically includes about 25% seed by weight. A resulting product to be recovered from the second device 230 can include about 80% seed by weight before being further processed. Typically, recovered seed is then supplied to a dryer to remove any residual moisture content before the seeds are transported or further processed to make grapeseed oil. The collected liftings can also be further processed, and it can be desirable that the liftings be substantially free of seed (e.g., less than 20% seed by weight) for other applications. For example, the collected liftings can be repurposed for animal feed or can be fermented and distilled.

Testing was performed of the process illustrated in FIG. 2 and compared with other processes for separating grape seed from wet pomace. The testing is further described in the following Examples.

The provided systems and methods can be applied to processing other fruits or vegetables that undergo pressing and from which seeds can be harvested for other purposes. For example, the provided systems and methods can be used for almond, walnut, hazelnut, corn, cherry, hemp, hops, canola, olive, blueberries, avocados, apricot, jojoba, meadowfoam, baobab, star anise, among others. The provided systems and methods can be particularly helpful where pomace produced by pressing of the fruit is of an approximately similar size, shape, and/or weight as the seed to be recovered.

EXEMPLIFICATION

Example 1. Testing of Drum Screen for Grape Seed Separation

Raw grape pomace comprising approximately 25% seed by weight and 45-60% moisture by weight was supplied to DMC and NECO rotary drum screens/seed cleaners with screen openings ranging from ⅛" to ⅝" for separation.

The drum screens were able to provide for some separation of component materials of the raw pomace; however, seed recovery was inadequate. After processing with the drum screens, the recovered product included approximately 50% seed by weight, which is insufficient for further processing, and the resulting waste contained substantial residual seed material upon visual inspection, which was unacceptable.

Example 2. Testing of Debearder and Aspirator Combination for Grape Seed Separation Raw grape pomace comprising approximately 25% seed by weight and 45-60% moisture by weight was supplied to a debearder (Clipper® Debearder Pro, A. T. Ferrel Company, Bluffton, IN) and, subsequently, to an aspirator (Duo Aspirator, Carter Day, Minneapolis, MN).

A single cycle through each of the debearder and aspirator was performed, with the resulting product including approximately 75-80% seed by weight, which is sufficient for further processing of the seeds for the making of grapeseed oil. Furthermore, the resulting waste product (i.e., liftings from the aspirator) included approximately <5% seed, indicating very effective recovery of seeds in the retained stream of material.

Example 3. Throughput Capacity

Observed maximum effective throughput was 55 pounds of cleaned seeds per minute, with the cleaned seed stream comprising 80-85% seeds, which equates to 5.2-5.5 tons per hour of pomace throughput based on unprocessed pomace composition of 25% seeds.

Example 4. Moisture Content and Drying Time

Drying time of the separated seed ranged from approximately 14 to 16 hours. Seeds were produced ranging from 5-14% moisture content after processing as described above and drying. A target moisture content of seed being provided for press is about 10-12%. The system was capable of producing seed within targeted moisture ranges within a total processing time of 14.25-16.25 hours.

The aeration/aspiration process significantly reduced a quantity of material to be dried. Conventional pomace processing would require drying the complete pomace stream prior to separation of the useful seeds. The aeration/aspiration process successfully separated seeds approximately 25% of the pomace, from the total stream and significant reduced thermal energy required for drying versus conventional processing.

Seeds are about 30% moisture. In contrast, the wet paper and skins that make up a bulk of the pomace are about 70% moisture. The aeration/aspiration process advantageously removed most of the moisture by physical separation rather than thermal evaporation, providing for significant energy savings. In particular, water requires 970 BTU/pound for evaporation. The aeration/aspiration process removes approximately 1000 pounds of moisture (equivalent to approximately 970,000 BTU) from each ton of pomace processed. A remaining amount of moisture to be removed, approximately 90-100 pounds of moisture (i.e., approximately 18% moisture reduction on 25% of the total stream), requires only about 87,000-97,000 BTU to achieve desired dryness.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A method of separating seed from wet material, comprising:
   aerating raw, wet material comprising seed, the aerating providing aerated material comprising pomace that is of at least one of an approximately similar size, shape, and weight as the seed, the aerating comprising exposing the raw, wet material to a debearder comprising a plurality of rotating beater arms disposed among a plurality of stationary arms, the raw, wet material being aerated by rotational movement of the rotating beater arms;
   aspirating the aerated material, the aspirating separating seed of the aerated material from liftings of the aerated material, and the aspirating comprising exposing the aerated material to an aspirator comprising an aspiration chamber, an inlet configured to supply the aerated material to the aspiration chamber, a feed roll to meter an amount of the aerated material entering the aspirator, an air inlet configured to supply an air flow to the aspiration chamber, a seed outlet at a base of the aspiration chamber configured to expel seed permitted to fall to the base of the aspiration chamber, a liftings chamber configured to receive liftings carried upwards towards the liftings chamber from the aspiration chamber, a liftings conveyor, at least one liftings outlet, and a damper configured to control a velocity of air moving through the aspirator, the aspirator thereby separating the seed from the pomace that is of at least one of an approximately similar size, shape, and weight as the seed by separating the aerated material into component elements of the seed and liftings by density upon exposure to the air flow in the aspiration chamber and to output the seed separated from the aerated material from the seed outlet; and
   recovering the separated seed.

2. The method of claim 1, wherein the raw, wet material is grape pomace and the seed is grape seed.

3. A system for separating seed from wet material, comprising:
   a debearder comprising a plurality of rotating beater arms disposed among a plurality of stationary arms, the debearder configured to aerate raw, wet material comprising seed by rotational movement of the rotating beater arms to produce an aerated material, the aerated material comprising pomace that is of at least one of an approximately similar size, shape, and weight as the seed; and an aspirator an aspiration chamber, an inlet configured to supply the aerated material to the aspiration chamber, a feed roll to meter an amount of the aerated material entering the aspirator, an air inlet configured to supply an air flow to the aspiration chamber, a seed outlet at a base of the aspiration chamber configured to expel seed permitted to fall to the base of the aspiration chamber, a liftings chamber configured to receive liftings carried upwards towards the liftings chamber from the aspiration chamber, a liftings conveyor, at least one liftings outlet, and a damper configured to control a velocity of air moving through the aspirator, the aspirator being thereby configured to separate the seed from the pomace that is of at least one of an approximately similar size, shape, and weight as the seed by separating the aerated material into component elements of the seed and liftings by density upon exposure to the air flow in the aspiration chamber and to output the seed separated from the aerated material from the seed outlet.

4. The system of claim 3, further comprising a connecting element disposed between the debearder and the aspirator, wherein the debearder further comprises an outlet configured to eject the aerated material, the aspirator further comprises an inlet, and the connecting element is configured to introduce the aerated material exiting the outlet of the debearder to the inlet of the aspirator.

5. The system of claim 3, wherein the debearder is disposed in serial connection with the aspirator.

6. A method of separating grape seed from wet pomace, comprising:

aerating the wet pomace with a debearder to produce an aerated pomace, the debearder comprising a plurality of rotating beater arms disposed among a plurality of stationary arms, the debearder configured to aerate raw, wet material comprising the wet pomace and grape seed by rotational movement of the rotating beater arms to produce the aerated pomace, the aerated material comprising pomace that is of at least one of an approximately similar size, shape, and weight as the grape seed;

aspirating the aerated pomace with an aspirator to separate component elements of the aerated pomace by density, one of the component elements being the grape seed, the aspirator comprising an aspiration chamber, an inlet configured to supply the aerated material to the aspiration chamber, a feed roll to meter an amount of the aerated material entering the aspirator, an air inlet configured to supply an air flow to the aspiration chamber, a seed outlet at a base of the aspiration chamber configured to expel seed permitted to fall to the base of the aspiration chamber, a liftings chamber configured to receive liftings carried upwards towards the liftings chamber from the aspiration chamber, a liftings conveyor, at least one liftings outlet, and a damper configured to control a velocity of air moving through the aspirator, the aspirator being thereby configured to separate the seed from the pomace that is of at least one of an approximately similar size, shape, and weight as the seed by separating the aerated material into the component elements of the seed and liftings by density upon exposure to the air flow in the aspiration chamber and to output the seed separated from the aerated material from the seed outlet; and collecting separated grape seed from the aspirator.

7. The method of claim 6, further comprising supplying the wet pomace to the debearder and the aspirator within about 24 hours after generation of the wet pomace from grape crush.

8. The method of claim 6, further comprising supplying the wet pomace to the debearder and the aspirator within about 12 hours after generation of the wet pomace from grape crush.

9. The method of claim 6, wherein the wet pomace comprises a moisture content of about 40 to about 70% by weight.

10. The method of claim 6, wherein the wet pomace comprises materials remaining upon crushing of grapes to produce grape juice.

11. The method of claim 6, wherein the wet pomace comprises grape seed, grape skin, and filter residue.

* * * * *